United States Patent [19]
Fowler

[11] 3,984,968
[45] Oct. 12, 1976

[54] COTTON STRIPPING APPARATUS

[76] Inventor: Lambuth G. Fowler, 2506 - 46th St., Lubbock, Tex. 79413

[22] Filed: Feb. 3, 1975

[21] Appl. No.: 546,739

[52] U.S. Cl. ................................................. 56/33
[51] Int. Cl.² ........................................ A01D 46/12
[58] Field of Search .......................... 56/33, 34, 35; 280/34 R; 180/75; 111/1, 85; 47/9

[56] References Cited
UNITED STATES PATENTS

| | | | |
|---|---|---|---|
| 963,874 | 7/1910 | Daimler | 180/75 |
| 2,544,411 | 3/1951 | Altgelt | 56/34 X |
| 3,014,547 | 12/1961 | vanderLely | 280/34 R X |
| 3,067,561 | 12/1962 | Jezek | 56/34 |
| 3,559,599 | 2/1971 | Hoadley | 111/85 |

*Primary Examiner*—Russell R. Kinsey
*Attorney, Agent, or Firm*—Charles B. Cannon

[57] ABSTRACT

A cotton stripping apparatus which includes a wheel-bearing carriage including a housing having an open front end means for blowing the stripped cotton into a trailer wagon or basket, and cotton stripper means in the form of a plurality of cotton stripper bars extending in generally parallel relationship through the housing at the bottom thereof and rearwardly from the end portion thereof, and guide wheels mounted in the front end portion of the housing at an acute angle to the vertical so that the inclined guide wheels will ride on the side portions or slopes of the upraised cotton-bearing ground rows and thereby elevate the cotton stripper bars above the ground rows and prevent them from digging into the top or upper portions of the ground rows and picking up parts of the ground soil, sticks, stones and other debris, while, at the same time, enabling the cotton stripper bars effectively to strip the cotton bolls from their stalks.

3 Claims, 8 Drawing Figures

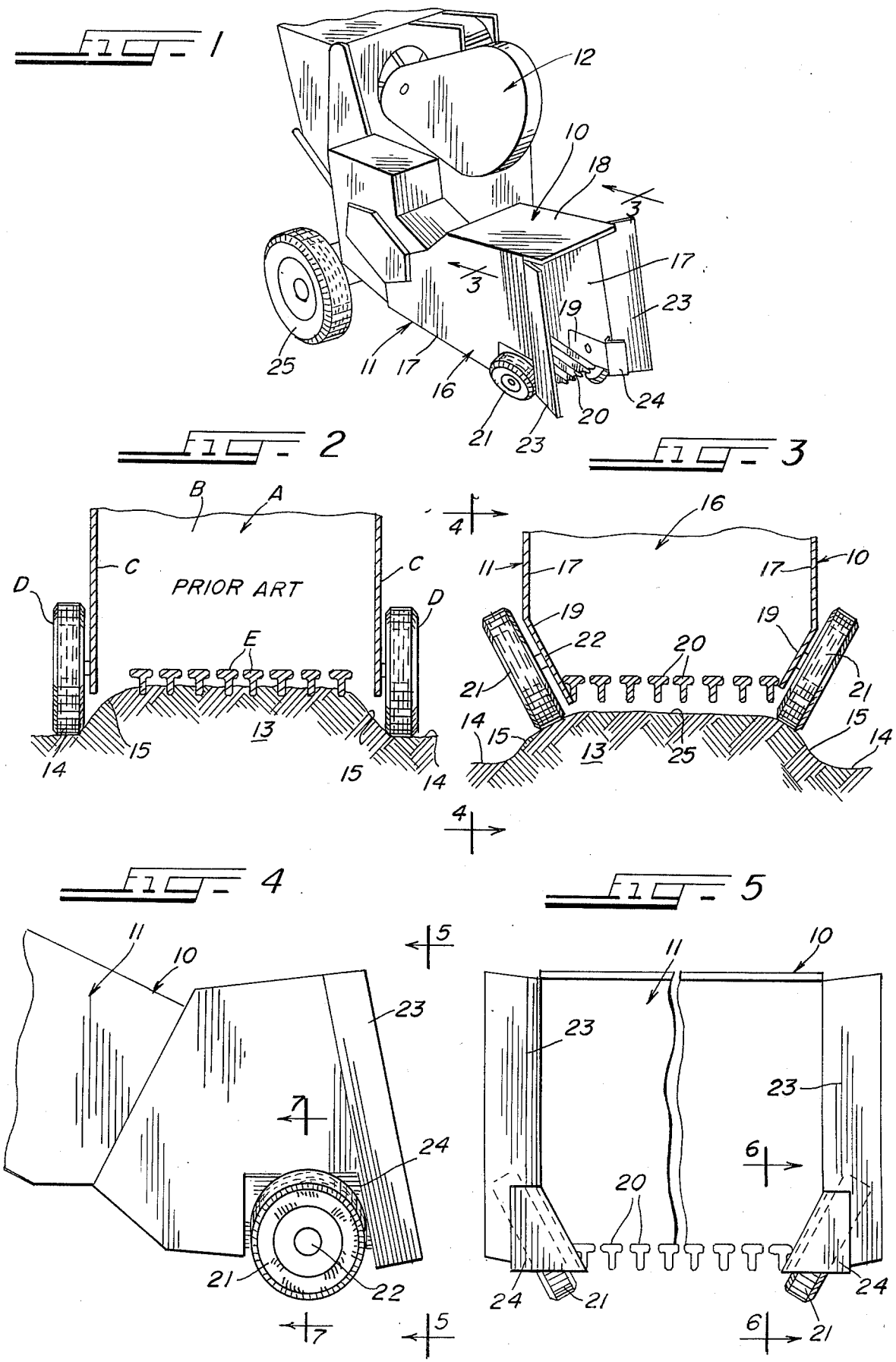

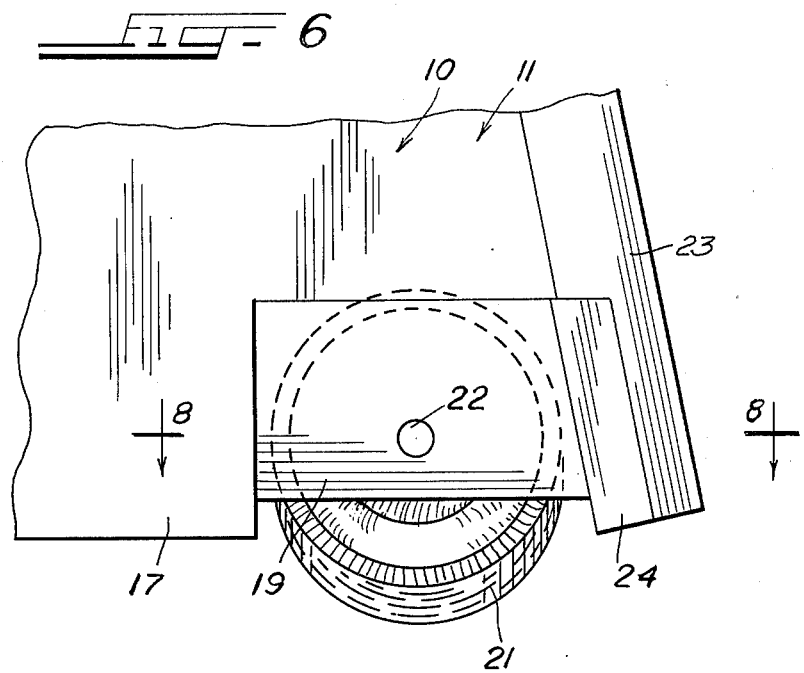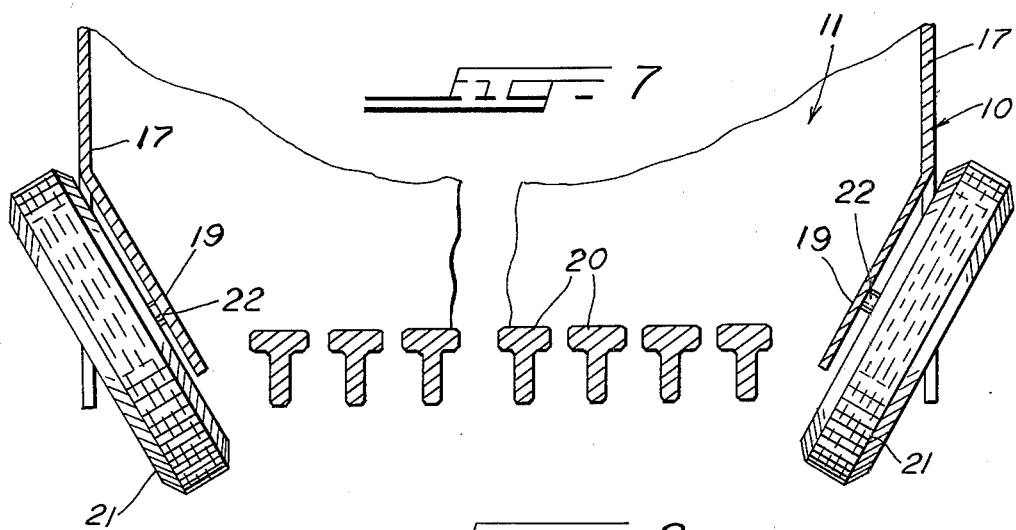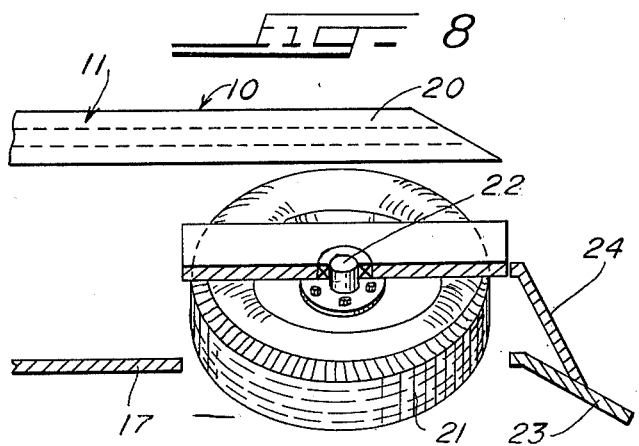

COTTON STRIPPING APPARATUS

OBJECTS OF THE INVENTION

An object of the invention is to provide a new and improved cotton stripping apparatus which includes a wheel-bearing carriage including means for blowing the cotton into a trailer wagon or basket, and having an open front end, and cotton stripper means in the form of a plurality of cotton stripper bars extending in generally parallel relationship through the housing at the bottom thereof and rearwardly from the said open front end thereof, and guide wheels mounted in the front end portion of the housing at an acute angle to the vertical so that the inclined guide wheels will ride on the side portions or slopes of the upraised cotton-bearing rows and thereby elevate the cotton the cotton stripper bars above the ground rows and prevent them from digging into the upper or top portions of the ground rows and picking up parts of the ground soil, sticks, stones, green cotton bolls, and other debris, while, at the same time, enabling the cotton stripper bars effectively to strip the cotton bolls from their stalks.

Another object of the invention is to provide a novel arrangement of the inclined guide wheels on the housing of the cotton stripping apparatus.

An additional object of the invention is to provide on the new cotton stripping apparatus novel guide means for directing the cotton-bearing stalks into and between the stripper bars.

Other objects will appear hereinafter.

DESCRIPTION OF FIGURES IN THE DRAWINGS

FIG. 1 is a perspective view of a cotton stripping apparatus embodying the present invention;

FIG. 2 is a sectional view illustrating the prior art cotton stripping apparatus;

FIG. 3 is a transverse sectional view on line 3—3 in FIG. 1;

FIG. 4 is a fragmentary side elevational view on line 4—4 in FIG. 3;

FIG. 5 is fragmentary side elevational view on line 5—5 in FIG. 4;

FIG. 6 is a view on line 6—6 in FIG. 5, partly in section and partly in elevation;

FIG. 7 is an enlarged sectional view on line 7—7 in FIG. 4; and

FIG. 8 is a plan view on line 8—8 in FIG. 6, partly in section and partly in elevation.

A typical and preferred embodiment of the new cotton stripping apparatus is illustrated in FIGS. 1 to 8, inclusive, of the drawings, wherein it is generally indicated at 10, and comprises a wheel-bearing power or tractor-hauled supporting carriage or frame 11 on which are mounted means, generally indicated at 12, for blowing the stripped cotton into a trailer wagon or into a collecting basket, as is well understood in the art.

Cotton normally grows upon stalks which are arranged in rows in the form of upraised mounds of earth and a typical prior art cotton harvester or cotton stripping apparatus is illustrated in FIG. 2 of the drawings wherein it is generally indicated at A and includes a supporting carriage or frame B having vertically extending side walls C on which guide wheels D are rotatably mounted in a vertical plane and in generally parallel relationship. A plurality of cotton stripper bars E are mounted in the lower end portion of the supporting carriage or frame B in spaced generally parallel relationship and as the cotton harvester or stripping apparatus A is moved over the upraised earth row 13 to strip the cotton from the stalks the stripper bars E engage the cotton stalks and strip the cotton bolls therefrom. However, it will be noted by reference to FIG. 2, that in the prior art cotton stripping apparatus, the stripper bars E tend to dig into the upper or top portion of the cotton earth row 13, as the guide wheels D travel over the ground level surface 14 at the bottom of the inclined sides or slopes 15 of the upraised ground rows 13, with the result that the cotton stripper bars E tend to pick up parts of the ground soil, sticks, stones, and other debris, from the upraised ground rows 13.

The new cotton stripper apparatus 10 includes a forwardly extending housing 16 which includes generally parallel vertically extending side walls 17 having a longitudinally extending top wall 18 extending therebetween, and each of the side walls 17 has an inwardly inclined lower end flange portion 19 and cotton stripper bars 20 which are disposed between the lower end portions of the inwardly inclined flange portions 19 of the side walls 17; the stripper bars 20 being arranged in generally parallel horizontally spaced relationship and being mounted in position of use in a manner which is well understood in the art, and extending rearwardly from the open front of the housing 16 so that the cotton stalks and attached bolls may pass therebetween.

The new cotton stripper apparatus 10 includes rear and main supporting wheels 25 which are rotatably mounted on the housing 16 at the rear thereof, and front guide wheels 21 each of which is rotatably mounted, as at 22, in an anti-friction bearing unit, as 22, on the outer side of one of the inwardly inclined flange members 19 of the side walls 17 of the supporting frame or carriage 11 and in generally co-planar relationship with the adjacent inwardly inclined flange member 19, as shown in the drawings; it being noted that the front guide wheels 21 are mounted at an acute angle to the vertical and are inclined inwardly from their upper ends to their lower ends and toward the row of cotton stripper bars 20 and that the front guide wheels 21 extend below the cotton stripper bars 20 (FIGS. 3, 5, 6 and 7).

The new cotton stripping apparatus 10 includes a pair of outwardly flared and vertically extending first or primary guide members 23 which are arranged at the front of the cotton stripper apparatus 10 and are attached to the side walls 17, and a pair of secondary and smaller guide members each of which is mounted on the lower end portions of one of the primary guide members 23.

In the use of the new cotton stripper apparatus 10 the same is drawn by a tractor, or other power source, along the upraised earth rows or mounds 13, main and rear supporting wheels 25 travel over the ground level surface 14 while the inwardly inclined front guide wheels 21 ride upon the upper portions of the side walls 15 of the upraised earth rows or mounds 13, as shown in FIG. 3, with the result that the cotton stripper bars 20 are raised or elevated above the upper or top surface 25 of the earth row or mound 13 as they travel along the rows of cotton stalks (not shown) which pass between the stripper bars 20, which thus strip the cotton bolls therefrom. In this manner, the cotton stripper bars 20 are prevented from digging into the upper portion of the upraised earth rows or mounds 13, as in the use of comparable prior art cotton stripping apparatus, as illustrated in FIG. 2, and thus the cotton stripper bars 20 effectively strip the cotton bolls from the cotton stalks while preventing the cotton stripper bars 20 from digging into the upper portions of the upraised earth rows or mounds 13 and picking up portions of the ground soil, sticks, stones and other debris.

The primary guide members 23 and the auxiliary guide members 24 help to direct the cotton stalks into and between the cotton stripper bars 20 as the cotton stripping apparatus 10 is moved along the upraised cotton rows or mounds 13.

It will thus be seen from the foregoing description, considered in conjunction with the accompanying drawings, that the present invention provides a new and improved cotton stripping apparatus, having the desirable advantages and characteristics and accomplishing its intended objects including those hereinbefore pointed out and others which are inherent in the invention.

I claim:
1. Cotton stripping apparatus comprising:
    a. a wheel-bearing power-drawn carriage adapted to be drawn along an upraised cotton-bearing earthen mound over rows of cotton-bearing stalks growing thereon;
    b. a housing on the said wheel-bearing power-drawn supporting carriage having
        1. spaced generally vertically extending side walls each having
            a. a lower end portion;
            2. an open front; and
        3. means for directing the stripped cotton bolls into a trailer wagon or into a cotton receiving basket disposed rearwardly of the said power-drawn supporting carriage;
    c. a row of cotton stripper bars mounted in coplanar spaced relationship on the lower end portion of the said supporting carriage between the said lower end portions of the said generally vertically extending side walls and extending forwardly at the said open front of the said housing and adapted to travel along rows of cotton stalks on the said upraised cotton-bearing earthen mound to strip the cotton bolls from their stalks;
    d. a pair of guide wheels each rotatably mounted on the said lower end portion of one of the said generally vertically extending side walls of the said power-drawn carriage;
    e. means for rotatably mounting each of the said guide wheels on the said lower end portion of one of the said generally vertically extending side walls at an acute angle to the vertical with each of the said guide wheels extending angularly inwardly from its upper end to its lower end and toward the said row of cotton stripper bars; and
    f. the said lower end portion of each of the said generally vertically extending side walls of the said housing having the form of a flange member extending downwardly and inwardly from the corresponding one of the said generally vertically extending side walls toward the said row of cotton stripper bars.

2. A cotton stripping apparatus as defined in claim 1 in which
    a. each of the said guide wheels is rotatably mounted on the outer side of one of the said flange members and in generally parallel relationship with the said one of said flange members.

3. Cotton stripping apparatus for stripping cotton bolls from cotton stalks growing upon the generally horizontal upper surface of an upraised earthen mound which includes downwardly sloping side walls comprising
    a. a wheel-bearing power-drawn carriage adapted to be drawn along the said upraised earthen mound over rows of cotton-bearing stalks growing on the said generally horizontal upper surface thereof;
    b. a housing on the said wheel-bearing power-drawn supporting carriage having
        1. spaced side walls each having
            a. a lower end portion; and
            2. an open front;
        3. means for directing the stripped cotton bolls into a trailer wagon or into a cotton-receiving basket disposed rearwardly of the said power-drawn supporting carriage;
    c. a row of cotton stripper bars mounted in coplanar spaced relationship on the lower end portion of the said supporting carriage between the said lower end portions of the said side walls and extending forwardly at the said open front of the said housing and adapted to travel along the said row of cotton stalks on the said upraised earthen mound to strip cotton bolls from their stalks;
    d. a pair of guide wheels each rotatably mounted on the said lower end portion of one of the said side walls of the said power-drawn carriage;
    e. each of the said guide wheels including
        1. a lower end portion which is inclined inwardly toward the said row of cotton stripper bars and extends below the said row of cotton stripper bars so as to raise the said row of cotton stripper bars above the said generally horizontal upper surface of the said upraised earthen mound; and
    f. means for rotatably mounting each of the said guide wheels on the said lower end portion of one of the said side walls at an acute angle to the vertical with each of the said guide wheels extending angularly inwardly from its upper end to its lower end and toward and below the said row of cotton stripper bars with each of the said guide wheels riding upon one of the said downwardly sloping side walls of the said upraised earthen mound.

* * * * *